United States Patent
Ramesh (10) Patent No.: US 6,636,740 B1
(45) Date of Patent: Oct. 21, 2003

(54) APPARATUS AND METHODS FOR POSITION COMPUTATION BASED ON BROADCAST INITIALIZATION DATA

(75) Inventor: Rajaram Ramesh, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 713 days.

(21) Appl. No.: 09/098,049

(22) Filed: Jun. 16, 1998

(51) Int. Cl.$^7$ ................................. H04Q 7/20
(52) U.S. Cl. ................... 455/456; 342/357.06
(58) Field of Search ................ 455/456, 457, 455/466, 13.2; 342/357.15, 358, 457, 357.1, 357.02, 357.06; 714/700

(56) References Cited

U.S. PATENT DOCUMENTS

| | | | |
|---|---|---|---|
| 4,445,118 A | 4/1984 | Taylor et al. | 343/357 |
| 5,365,450 A | * 11/1994 | Schuchman et al. | 342/457 |
| 5,418,538 A | 5/1995 | Lau | 342/357 |
| 5,663,734 A | 9/1997 | Krasner | 342/357 |
| 5,663,735 A | 9/1997 | Eshenbach | 342/357 |
| 5,726,893 A | 3/1998 | Schuchman et al. | 364/449.7 |
| 5,812,087 A | 9/1998 | Krasner | 342/357 |
| 5,841,396 A | 11/1998 | Krasner | 342/357 |
| 5,883,594 A | 3/1999 | Lau | 342/357 |

FOREIGN PATENT DOCUMENTS

WO    WO 90/15636    5/1996

OTHER PUBLICATIONS

Len Sheynblat, et al., *Time Recovery Via Pattern Match Technology*, T1P1.5/99–225r1, Jun. 4, 1999.

Scott Bloebaum, *Evaluation Worksheet for Assisted GPS*, T1P1.5/98–132r2, Jun. 1, 1998.
International Search Report dated May 25, 1999.
Parkinson et al., "Global Position System: Theory and Applications, vol. 1", Progress in Astronautics and Aeronautics, vol. 163, pp. 29–37, 330–351.
Lee, "Mobile Cellular Telecommunications Analog and Digital Systems, Second Edition", McGraw–Hill, Inc., 1995, pp. 502–533.
"Jupiter" Global Positioning System (GPS) Receiver, Rockwell Semiconductor Systems, pp. 1–17, Jan. 19, 1998.
Jupiter brochure, *Rockwell Semiconductor Systems*.

* cited by examiner

Primary Examiner—Lee Nguyen
(74) Attorney, Agent, or Firm—Myers Bigel Sibley & Sajovec (57) ABSTRACT

The present invention provides apparatus and methods for position computation with high accuracy, low acquisition time and low power consumption. The position computation apparatus includes a radio communication receiver which monitors a radio communication network, such as a cellular network, covering the geographic region in which the position computation apparatus is located. The apparatus demodulates the signal from the radio communication network and obtains positioning data from the broadcast channel of the network for use in satellite acquisition operations prior to computing a position. The apparatus further includes a receiver for receiving positioning messages broadcast by a constellation of GPS satellites. A position computation circuit in the apparatus utilizes the positioning data obtained from the radio communication network in initial acquisition of one or more positioning satellites. Once the desired number of positioning satellites have been acquired, positioning messages are received from the acquired positioning satellites and used to calculate the position of the position computation apparatus.

26 Claims, 4 Drawing Sheets

GPS Satellite

Base Station

GPS Satellite

Base Station

APPARATUS AND METHODS FOR POSITION COMPUTATION BASED ON BROADCAST INITIALIZATION DATA

FIELD OF THE INVENTION

The present invention relates to position computation apparatus and methods, more particularly, to apparatus and methods for position computation for a device located within the coverage area of a radio communication system.

BACKGROUND OF THE INVENTION

Wireless (or radio) communication networks are commonly employed to provide voice and data communications to a plurality of subscribers within a prescribed geographic area. For example, analog cellular radiotelephone systems, such as those designated AMPS, ETACS, NMT-450, and NMT-900, have been deployed successfully throughout the world. Recently, digital cellular radiotelephone systems such as those designated IS-54B (and its successor IS-136) in North America and GSM in Europe have been introduced and are currently being deployed. These systems, and others, are described, for example, in the book entitled *Cellular Radio Systems*, by Balston, et al., published by Artech House, Norwood, Mass. (1993). In addition to the above systems, an evolving system referred to as Personal Communication Services (PCS) is being implemented. Examples of current PCS systems include those designated IS-95, PCS-1900, and PACS in North America, DCS-1800 and DECT in Europe, and PHS in Japan. These PCS systems operate at the 2 gigahertz (GHz) band of the radio spectrum, and are typically being used for voice and high bit-rate data communications.

Wireless systems, such as those identified above, may include one or more wireless mobile terminals that communicate with a plurality of cells served by base stations which are in turn connected to a Mobile Telephone Switching Office (MTSO). These base stations are typically placed in a fixed geographic location and cover a limited geographic region, generally referred to as a cell, located in the proximity of the base station.

The cells generally serve as nodes in the radio communication network, from which links are established between wireless mobile terminals by way of the base stations servicing the cells. Each cell will typically have allocated to it one or more dedicated control channels and one or more traffic channels. The control channel is a dedicated channel used for transmitting, typically by broadcasting, cell identification, paging and other information.

Other technologies rely on receipt of wireless transmissions to provide beneficial information. One such technology is the Global Positioning System (GPS). It will be understood that the terms "global positioning system" or "GPS" are used to identify any spaced-based system that measures positions on earth, including the GLONASS satellite navigation system in Europe. As is well known to those having skill in the art, GPS is a space-based triangulation system using satellites and computers to measure positions anywhere on the earth. GPS was first developed by the United States Department of Defense as a navigational system. Compared to other land-based systems, GPS may be unlimited in its coverage, may provide continuous 24-hour coverage regardless of weather conditions, and may be highly accurate. While the GPS technology that provides the greatest level of accuracy has been retained by the government for military use, a less accurate service has been made available for civilian use.

In operation, a constellation of satellites orbiting the earth continually emit a GPS radio frequency signal at a predetermined chip frequency. A GPS receiver, e.g., a hand-held radio receiver with a GPS processor, receives the radio signals from the closest satellites and measures the time that the radio signals take to travel from the GPS satellites to the GPS receiver antenna. An example of such a receiver is the "Jupiter" GPS receiver board available from Rockwell Semiconductor Systems which is described in a Data Sheet dated Jan. 19, 1998. By multiplying the travel time by the speed of light, the GPS receiver can calculate a range for each satellite in view. From additional information provided in the radio signal from the satellites, including the satellite's orbit and velocity and correlation to its onboard clock, the GPS processor can calculate the position of the GPS receiver through a process of triangulation.

One problem with GPS systems is the time and power required to initially acquire a communication connection with a sufficient number of positioning satellites to compute a position. In particular, if the GPS detection system does not have any estimate of its location, it does not know which of the constellation of satellites is within view nor the location in space of the satellites in its viewing area. Accordingly, a cold start is required for acquisition which typically consumes a significant amount of power and requires more time than a warm start (i.e. a start with an initial position estimate). A typical GPS receiver, such as the Jupiter receiver from Rockwell Semiconductor Systems, has different satellite acquisition modes of operation. A first mode is warm start. This states typically occurs after a period of continuous operation or after a short idle period, wherein position, time, velocity and ephemeris data are reasonably valid. A warm start typically results in the shortest acquisition period. A second mode is initialized start wherein the user supplies position and time information, or information from a previous operation is available from onboard memory. Unlike warm start, as velocity and ephemeris data are not available in this mode, acquisition times are typically slower. A third mode is cold start in which the only information available may be almanac information to identify previously operational satellites. This mode accordingly provides slower acquisition than warm start or initialized start. Finally, the slowest acquisition time is provided by what is referred to as frozen start in which no information at all is available before seeking to acquire a satellite.

Another method previously used to improve the accuracy of a GPS system is differential GPS with broadcast corrections. In this approach, the normal transmission from a GPS satellite contain systematic errors which may be removed by using correction information broadcast by entities such as the Coast Guard. These broadcasting entities obtain correction information by comparing their known position to the position calculated using the GPS information received from the transmitting positioning satellite. This information is typically broadcast on specific subcarriers by the entities. Using this type of information, a GPS receiver can improve the accuracy of its calculation. However, while this method may be expected to improve the accuracy of the receiver, it does not provide improved acquisition time or reduce power consumption for the receiver.

It would be desirable to provide for warm start under as many conditions as possible. It is known to obtain position data from a user, for example, by keypad entry. It is also known to use previous position data that has been stored in memory. However, these approaches typically require user input and generally do not provide ephemeris data with which to reduce acquisition time and lower power consumption.

SUMMARY OF THE INVENTION

In light of the foregoing, it is an object of the present invention to provide apparatus and methods for position computation with warm start acquisition of a positioning satellite.

It is another object of the present invention to provide apparatus and methods for position computation with warm start which may be provided with minimal additional hardware and utilizing existing radio communication networks.

It is yet another object of the present invention to provide apparatus and methods for position computation with warm start which may be provided without requiring an account with existing radio communication networks.

These and other objects, features and advantages are provided according to the present invention by apparatus and methods for a position computation with high accuracy, low acquisition time and low power consumption. The position computation apparatus includes a radio communication receiver which monitors a radio communication network, such as a cellular network, covering the geographic region in which the position computation apparatus is located. The apparatus demodulates the signal from the radio communication network and obtains positioning data from the broadcast channel of the network for use in satellite acquisition operations prior to computing a position. The apparatus further includes a receiver for receiving positioning messages broadcast by a constellation of GPS satellites. A position computation circuit in the apparatus utilizes the positioning data obtained from the radio communication network in initial acquisition of one or more positioning satellites. Once the desired number of positioning satellites have been acquired, positioning messages are received from the acquired positioning satellites and used to calculate the position of the position computation apparatus.

By receiving position data from a base station of a radio communication network, as well as ephemeris data for positioning satellites in the viewing area of the base station/ computation apparatus and timing information, the position computation apparatus of the present invention is able to generally operate in warm start mode for satellite acquisition at all times when access to the radio communication network is available, thereby providing for the lowest power consumption and fastest acquisition time for position computation operations.

The receiver for the radio communication network may be a simplified receiver as two way communications are not required and the receiver need only be able to synchronize with and demodulate and decode positioning data incorporated pursuant to a predetermined protocol in a broadcast control channel of the radio communication network. Preferably, the position computation apparatus need not even obtain an account with the radio communication network in order to monitor the positioning data transmitted by base stations over the air. However, if an account is required by the radio communication network provider, and encryption is provided to prevent unauthorized users from accessing the information, the benefits of the present invention may still be obtained by providing the appropriate decryption circuitry in the position computation apparatus.

In one aspect of the present invention, a mobile position computation apparatus for use within a region serviced by a radio communication network is provided. The apparatus includes a first receiver for receiving a radio communication broadcast over the radio communication network and a second receiver for receiving positioning messages broadcast by a positioning satellite. A position computation circuit is coupled to the second receiver. Finally, a means is provided coupled to the first receiver for obtaining positioning data from the radio communication broadcast and providing the positioning data to the position computation circuit for use in acquisition of the positioning satellite. The means for obtaining positioning data in one embodiment includes means for demodulating and decoding the radio communication, means for obtaining the positioning data from the demodulated and decoded radio communication and means for providing the position computation circuit the positioning data obtained from the demodulated and decoded radio communication.

The positioning satellite may be a global positioning system satellite. The radio communication network may be a cellular communication network. The radio communication is preferably broadcast over the radio communication network on a broadcast control channel.

In a further aspect of the present invention, the positioning data is selected from the group consisting of ephemeris data for the positioning satellite, position of a base station transmitting the radio communication, clock correction information and a framing structure timestamp for the broadcast control channel. The position computation circuit includes means for warm starting acquisition of the positioning satellite based on the positioning data. In one embodiment of the present invention, the position computation circuit further includes means for limiting the time window and the Doppler frequency range over which it searches for the positioning messages broadcast by the positioning satellite based on the positioning data. The position computation circuit may further include means for selecting a subset of a plurality of positioning satellites as the positioning satellite based on the positioning data.

In a further embodiment of the present invention, a method is for acquisition of a positioning satellite from within the coverage area of a radio communication network broadcasting positioning data. The positioning data is received over the radio communication network. A positioning satellite is acquired based on the received positioning data. In one embodiment of the method aspects of the present invention positioning messages are received from the acquired positioning satellite.

DETAILED DESCRIPTION OF PREFERRED EMBODIMENTS

The present invention now will be described more fully hereinafter with reference to the accompanying drawings, in which embodiments of the invention are shown. Those skilled in the art will appreciate that the invention may be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

Figure 1:
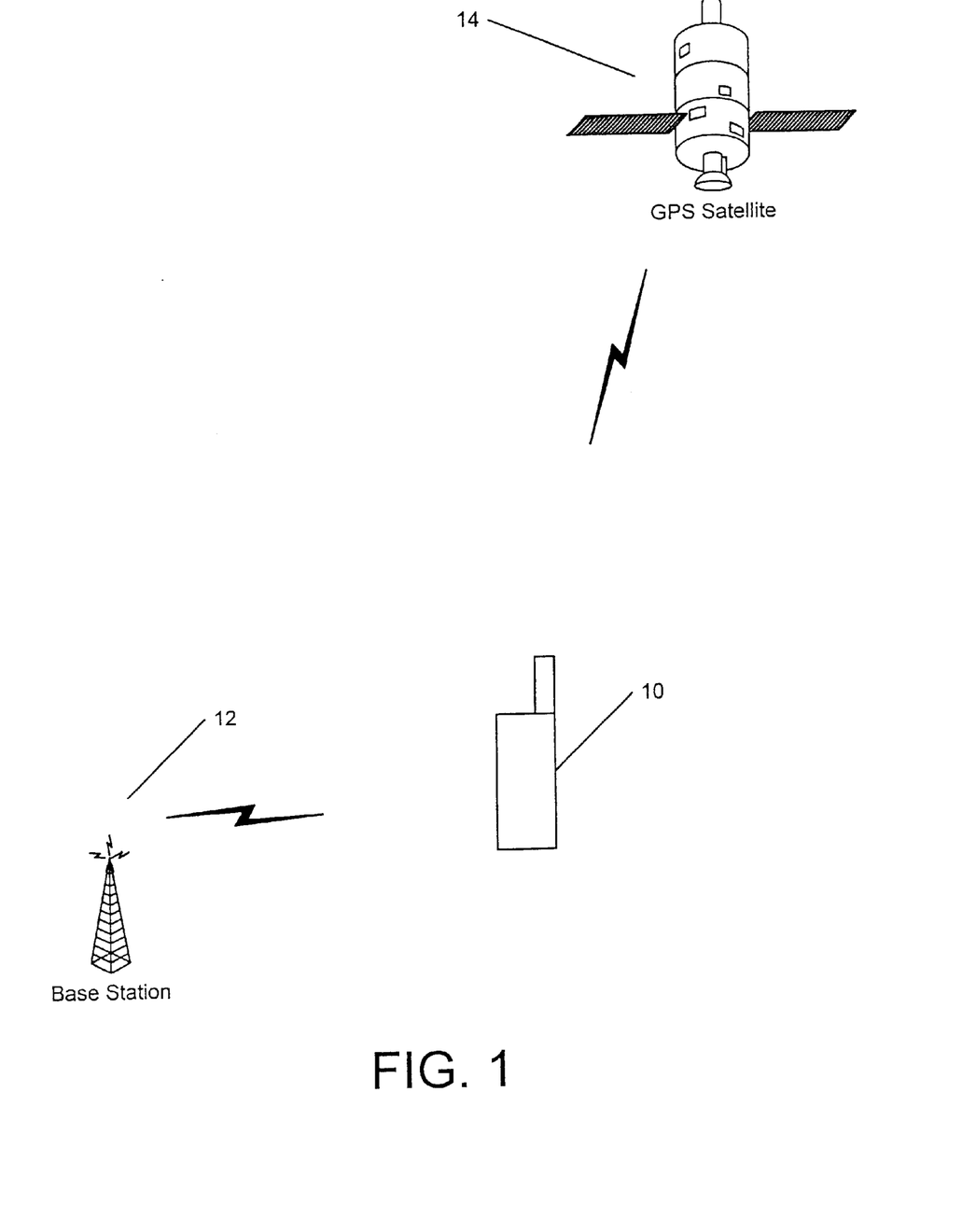
FIG. 1 is a schematic illustration of an embodiment of the position computation apparatus of the present invention in its operating environment.

Referring now to FIG. 1, the operating environment of the position computation apparatus of the present invention will now be described. Position computation apparatus 10 is located in a geographic area in which it is able to receive radio communications from both base station 12 and GPS (positioning) satellite 14. While only a single base station 12 is illustrated in FIG. 1, it is to be understood that base station 12 is generally a transmitter station covering a specific cell of a larger radio communication network including numerous cells and covering an extended geographic area. It is also to be understood that while base station 12, as illustrated in FIG. 1, is a terrestrial base station, the apparatus and methods of the present invention may also be utilized in connection with satellite based radio communication networks wherein a satellite covering a specific geographic region may serve the function of base station 12.

While only one GPS satellite 14 is illustrated in FIG. 1, it is to be understood that a constellation or plurality of positioning satellites are typically provided in a global positioning system. Such satellites, as described previously, may provide coverage for the entire earth at all times through a network of distributed positioning satellites. From any given location on earth, at any point in time, only a limited subset of the plurality of satellites is visible (i.e., in view) to a given position computation apparatus 10. Furthermore, while much of the description of the present invention the apparatus and operations is described with respect to acquiring a single positioning satellite, it is to be understood that, generally, a plurality of satellites are acquired for a single position computation. Typically, four separate satellites are acquired and positioning messages are obtained from each for use in calculating a three-dimensional location as well as a time. It is also to be understood that a lesser number of satellites may be acquired for a less complete location computation. For example, three satellites may be acquired to calculate a two-dimensional (latitude and longitude) position.

Figure 2:
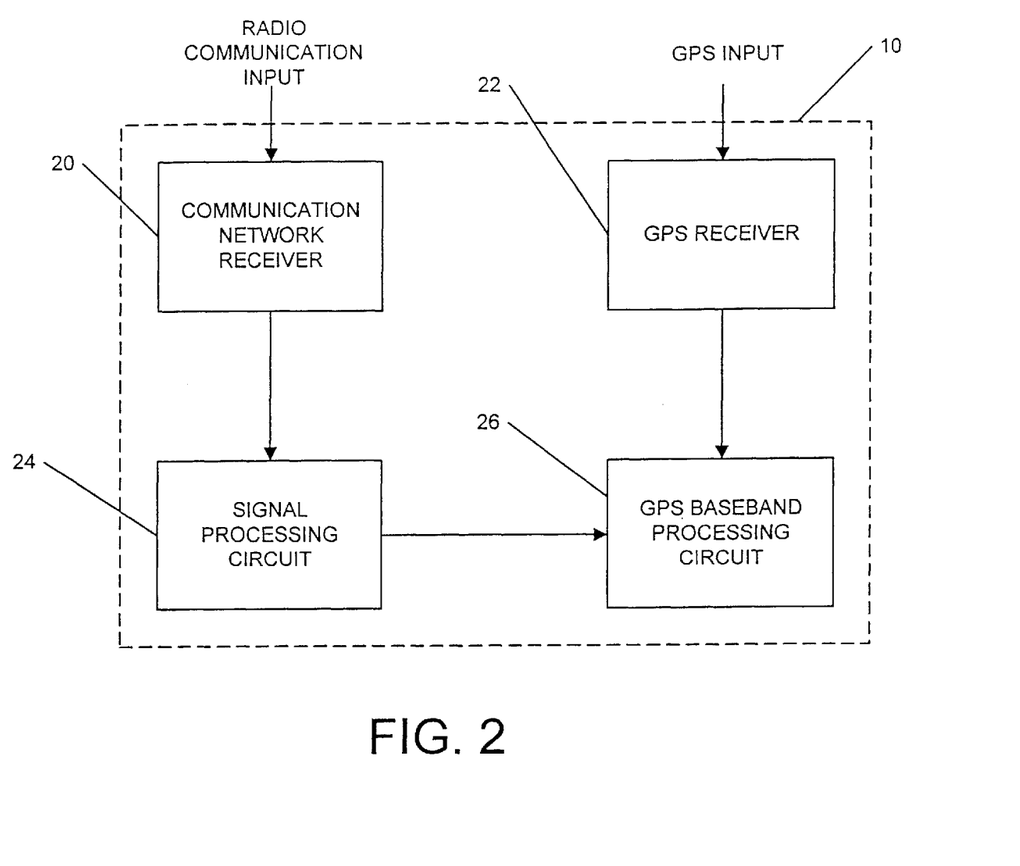
FIG. 2 is a block diagram of the position computation apparatus of FIG. 1.

Referring now to FIG. 2, the mobile position computation apparatus 10 of the present invention will be further described for a particular embodiment. As shown in FIG. 2, position computation apparatus 10 includes communication network receiver 20 for receiving radio communications broadcast over a radio communication network servicing the geographic location in which the position computation apparatus is located. Position computation apparatus 10 also includes a GPS type signal receiver 22 for receiving positioning messages broadcast by positioning satellites 14. Signals received from the radio communication base station 12 are passed by radio communication network receiver 20 to signal processing circuit 24 or other means for obtaining positioning data from the radio communication broadcast and providing the positioning data to a position computation circuit 26 for use in acquisition of a positioning satellite 14.

Depending upon the particular format and protocols utilized by base station 12 of the radio communication network, signal processing circuit 24 may provide means for demodulating and decoding the radio communication and means for obtaining the positioning data from the demodulated and decoded radio communication. Signal processing circuit 24 further provides means for providing the positioning data obtained from the demodulated and decoded radio communication to position computation circuit 26.

Position computation circuit 26 provides means for warm starting acquisition of a positioning satellite 14 based on the positioning data received from signal processing circuit 24. As will be described more fully in connection with the flowchart illustrations of operations according to the present invention, the positioning data may be utilized to provide a variety of improved operations related to satellite acquisition. The positioning data transmitted over the radio communication network preferably includes one or more of: ephemeris data for the positioning satellite, information describing the position of the base station 12 transmitting the radio communication, clock correction information such as that used in differential GPS and a time stamp of the framing structure in the broadcast information. By providing ephemeris data only for positioning satellites which are in view from base station 12, the position computation apparatus 10 is also providing an identification of the positioning satellites 14 which are currently in view.

The communication network receiver 20 need only provide limited capabilities compared to the transceiver circuitry required for a mobile terminal intended to communicate over the radio communication network through base station 12. In particular, communication network receiver 20 need only be capable of listening and synchronizing to a broadcast control channel of the cellular/PCS radio communication network broadcasting positioning data. It is the inventor's belief that there are efforts in place to standardize the transmission of GPS satellite positioning data suitable for use according to the apparatus and methods of the present invention on the broadcast control channel of presently installed radio communication networks. To optimize the performance of position computation circuit 26, it is desirable to providing positioning data including position, velocity, time and ephemeris information as described above. Communication network receiver 20 need not be a complete cellular phone as it does not need transmit functionality nor does it require keyboards or other user interfaces. All that is needed is sufficient circuitry to demodulate/decode the received radio communication sufficiently so as to be able to obtain the transmitted positioning data therefrom and provide the same to position computation circuit 26. Accordingly, a user of the position computation apparatus 10 of the present invention may not need to pay any subscription to the radio communication network service provider as the apparatus of the present invention merely listens to a control channel and otherwise does not interact with the radio communication network or burden it in any way.

Those skilled in the art will appreciate that the apparatus illustrated in FIGS. 1 and 2 may include a variety of commonly-used communications components. For example, the apparatus of FIG. 2 may include one or more digital signal processor (DSP) chips and/or application specific integrated circuits (ASICs). In general, it will be appreciated that the apparatus of FIGS. 1 and 2 may be implemented using special-purpose hardware, software or firmware running on general or special purpose data processors, and combinations thereof.

Figure 3:
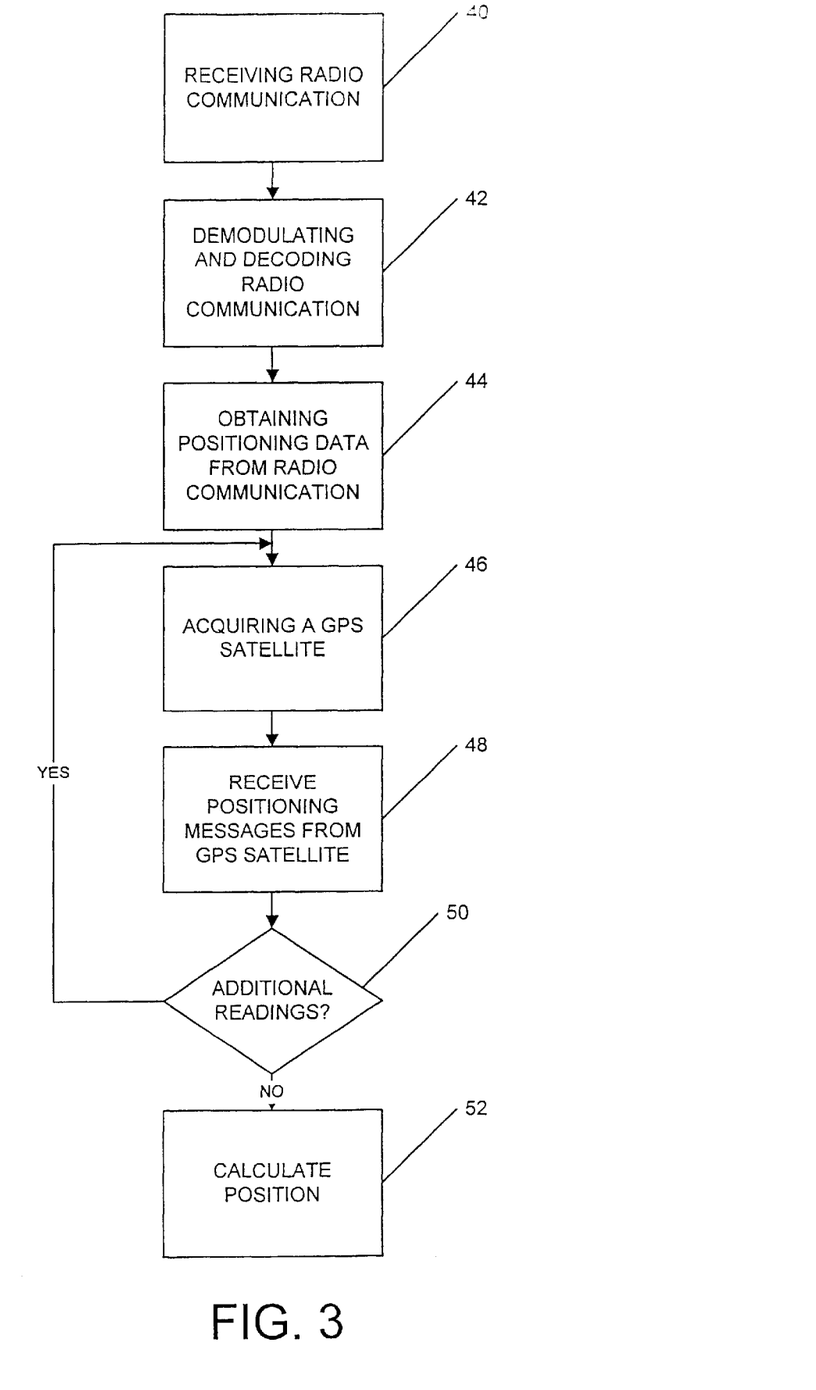
FIG. 3 is a flowchart illustration of operations for position computation according to an embodiment of the present invention.

Referring now to FIG. 3, operations for the position computation apparatus and methods of the present invention will now be described with reference to the flowchart illustration. At block 40, broadcast positioning data from a radio communication network is received over the radio communication network by apparatus 10. At block 42, the radio communication is demodulated. For an encoded control channel, the communication is also decoded at block 42. Positioning data is obtained from the demodulated and decoded radio communication as illustrated at block 44. A positioning satellite 14 is then acquired at block 46 based on the received positioning data. While not illustrated as a separate block in FIG. 3, when the apparatus is outside the coverage area of a radio communication network broadcasting positioning data, a positioning satellite is acquired without positioning data using known non-warm start initialization procedures. At block 48, positioning messages are received from the acquired positioning satellite. If it is determined at block 50 that readings are required from additional positioning satellites to obtain the desired position computation information, operations at block 46 and 48 are repeated until positioning messages have been received from a sufficient number of positioning satellites. Finally, at block 52, the positioning messages are used to calculate the position of the position computation apparatus 10.

Figure 4:
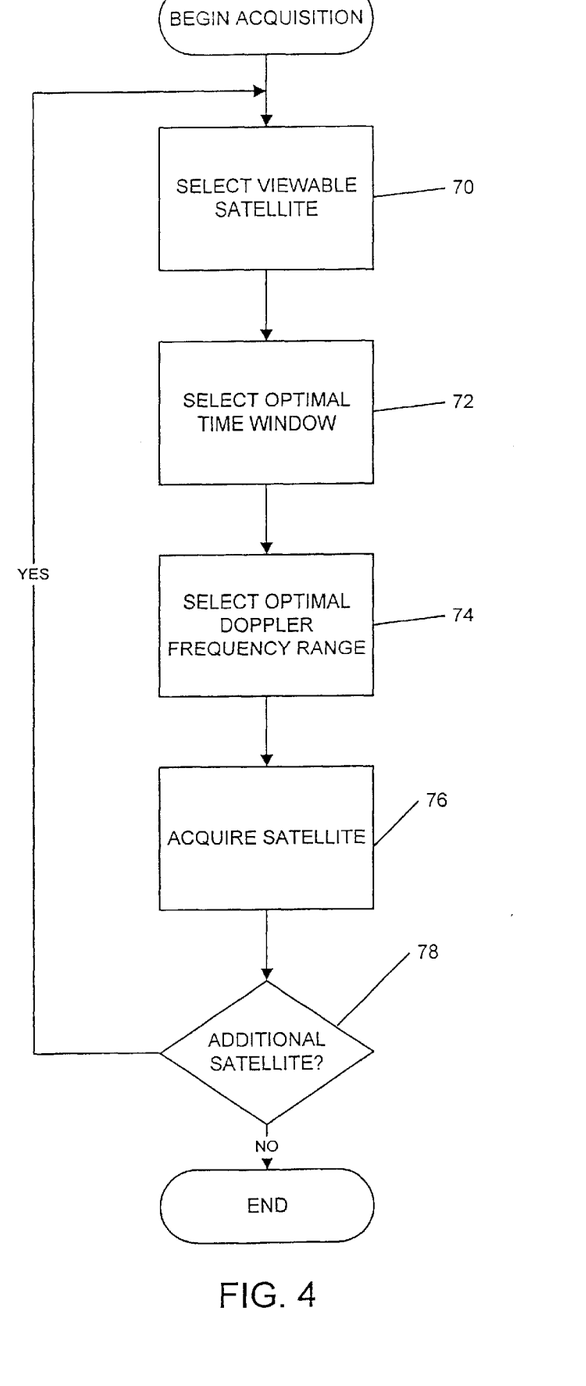
FIG. 4 is a flowchart illustration of satellite acquisition operations according to an embodiment of the present invention.

Referring now to FIG. 4, operations for block 46 related to acquiring a GPS satellite will now be described with further detail for a particular embodiment of the present invention. At block 70, a specific positioning satellite which should be viewable, as indicated by the received positioning data, is selected for acquisition. At block 72, a preferred time window for acquisition is selected based on approximate time and position information obtained from the positioning data. Using the approximate time and position information received from the radio communication network, a preferred doppler frequency range for use in searching for the selected viewable satellite is selected at block 74. The communicated signal from the selected positioning satellite is then acquired at block 76. It is to be understood that, while the present invention provides novel initialization apparatuss and methods related to satellite acquisition in a global positioning system, it is known to those of ordinary skill in the art how to accomplish the actual acquisition of the satellite utilizing the provided initialization information. Finally, as illustrated at block 78, the acquisition operations may be repeated to acquire and establish a communication channel with a plurality of additional positioning satellites 14 (see block 50 of FIG. 3).

It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

In the drawings and specification, there have been disclosed typical embodiments of the invention and, although specific terms are employed, they are used in a generic and descriptive sense only and not for purposes of limitation, the scope of the invention being set forth in the following claims.

That which is claimed:

1. A mobile position computation apparatus for use within a region serviced by a radio communication network comprising:
   a first receiver for receiving a radio communication broadcast over the radio communication network on a broadcast control channel;
   a second receiver for receiving positioning messages broadcast by a positioning satellite;
   position computation circuit coupled to the second receiver; and
   means coupled to said first receiver for obtaining positioning data from the radio communication broadcast and providing the positioning data to the position computation circuit for use in acquisition of the positioning satellite.

2. A position computation apparatus according to claim 1 wherein the positioning satellite is a global positioning system satellite.

3. A position computation apparatus according to claim 1 wherein the radio communication network is a cellular communication network.

4. A position computation apparatus according to claim 3 wherein the positioning data is selected from the group consisting of ephemeris data for the positioning satellite, includes a position of a base station transmitting the radio communication, clock correction information and a framing structure timestamp for the broadcast control channel.

5. A position computation apparatus according to claim 3 wherein the means coupled to the first receiver further comprises:
   means for demodulating and decoding the radio communication;
   means for obtaining the positioning data from the demodulated and decoded radio communication; and
   means for providing the position computation circuit the positioning data obtained from the demodulated and decoded radio communication.

6. A position computation apparatus according to claim 3 wherein the position computation circuit includes means for warm starting acquisition of the positioning satellite based on the positioning data.

7. A position computation apparatus according to claim 6 wherein the position computation circuit further includes means for limiting the time window during which it searches for the positioning messages broadcast by the positioning satellite based on the positioning data.

8. A position computation apparatus to claim 6 wherein the position computation circuit further includes further means for limiting the window during which it searches for the positioning messages broadcast by the positioning satellite based on the positioning data.

9. A position computation apparatus according to claim 6 wherein the positioning data includes an identification of only ones of a plurality of positioning satellites within view of the base station, and wherein the position computation circuit further includes means for selecting only ones of the plurality of positioning satellites within view of the base station as the positioning satellite based on the included identifications.

10. A method for acquisition of a positioning satellite from within the coverage area of a radio communication network broadcasting positioning data, the method comprising the steps of:
    receiving the positioning data over the radio communication network on a broadcast control channel; and
    receiving a radio communication from the positioning satellite; and acquiring the positioning satellite based on the received positioning data.

11. A method according to claim 10 wherein the step of receiving the positioning data comprises the steps of:
   receiving a broadcast radio communication containing the positioning data over the radio communication network on the broadcast control channel;
   demodulating the radio communication;
   decoding the radio communication; and
   obtaining the positioning data from the demodulated and decoded radio communication.

12. A method according to claim 10 wherein the positioning satellite is a global positioning system satellite.

13. A method according to claim 12 wherein the radio communication network is a cellular communication network.

14. A method according to claim 12 wherein the positioning data includes a position of a base station transmitting the radio communication.

15. A method according to claim 12 wherein the step of acquiring a positioning satellite includes the step of warm starting acquisition of the positioning satellite based on the positioning data.

16. A method according to claim 12 wherein the step of acquiring a positioning satellite includes the step of limiting the time window during which searches are made for the positioning messages broadcast by the positioning satellite based on the positioning data.

17. A method according to claim 12 wherein the step of acquiring a positioning satellite includes the step of limiting the Doppler frequency range over which searches are made for the positioning messages broadcast by the positioning satellite based on the positioning data.

18. A method according to claim 12 wherein the positioning data includes an identification of only ones of a plurality of positioning satellites within view of the base station, and wherein the step of acquiring a positioning satellite includes the step of selecting only ones of the plurality of positioning satellites within view of the base station as the positioning satellite based on the included identifications.

19. A method according to claim 10 further comprising the step following said receiving step of acquiring a positioning satellite without positioning data when outside the coverage area of a radio communication network broadcasting positioning data.

20. A method according to claim 10 further comprising the step following said acquiring step of receiving positioning messages from the acquired positioning satellite.

21. A method for acquisition of a positioning satellite from within the coverage area of a base station of a cellular radio communication network, the method comprising the steps of:
   periodically broadcasting positioning data including a position of the base station from the base station on a broadcast control channel; and
   wherein the following steps are performed by a mobile position computation apparatus:
      receiving the positioning data from the base station on the broadcast control channel without registering with the base station;
      demodulating the radio communication;
      decoding the radio communication;
      obtaining the positioning data from the demodulated and decoded radio communication, the obtained positioning data including a position of the base station; and
      acquiring the positioning satellite based on the received positioning data including the position of the base station.

22. A method according to claim 21 wherein the positioning data includes an identification of only ones of a plurality of positioning satellites within view of the base station, and wherein the step of acquiring the positioning satellite further comprises the step of acquiring only ones of the plurality of positioning satellites within view of the base station as the positioning satellite based on the included identifications.

23. A method for acquisition of a positioning satellite from within the coverage area of a base station of a cellular radio communication network, the base station periodically broadcasting positioning data including a position of the base station from the base station on a broadcast control channel, the method comprising the steps of:
   receiving the positioning data from the base station on the broadcast control channel without registering with the base station;
   demodulating the radio communication;
   decoding the radio communication;
   obtaining the positioning data from the demodulated and decoded radio communication, the obtained positioning data including the position of the base station; and
   acquiring the positioning satellite based on the received positioning data including the position of the base station.

24. A method according to claim 23 wherein the positioning data includes an identification of only ones of a plurality of positioning satellites within view of the base station, and wherein the step of acquiring the positioning satellite further comprises the step of acquiring only ones of the plurality of positioning satellites within view of the base station as the positioning satellite based on the included identifications.

25. A mobile position computation apparatus for use within a region serviced by a radio communication network comprising:
   a first receiver that receives a radio communication broadcast from a base station of the radio communication network on a broadcast control channel, the radio communication including positioning data including a position of the base station;
   a signal processing circuit that obtains the positioning data from the received radio communication;
   a second receiver for receiving positioning messages broadcast by a positioning satellite; and
   a position computation circuit coupled to the second receiver and the signal processing circuit that acquires the positioning satellite based on the positioning data including the position of the base station.

26. A position computation apparatus according to claim 25 wherein the positioning data includes an identification of only ones of a plurality of positioning satellites within view of the base station, and wherein the position computation circuit is further configured to acquire only ones of the plurality of positioning satellites within view of the base station as the positioning satellite based on the included identifications.

* * * * *

UNITED STATES PATENT AND TRADEMARK OFFICE
CERTIFICATE OF CORRECTION

PATENT NO. : 6,636,740 B1
DATED : October 21, 2003
INVENTOR(S) : Ramesh

It is certified that error appears in the above-identified patent and that said Letters Patent is hereby corrected as shown below:

Column 8,
Lines 22-27, should read -- 4. A position computation apparatus according to Claim 3 wherein the positioning data includes a position of a base station transmitting the ratio communication. --
Lines 47-51, should read -- 8. A position computation apparatus according to Claim 6 wherein the position computation circuit further includes means for limiting the Doppler frequency range over which it searches for the positioning messages broadcast by the positioning satellite based on the positioning data. --

Signed and Sealed this

Third Day of August, 2004

JON W. DUDAS
*Acting Director of the United States Patent and Trademark Office*